A. H. WOOD.
LAWN-MOWER ATTACHMENT.
No. 190,994. Patented May 22, 1877.
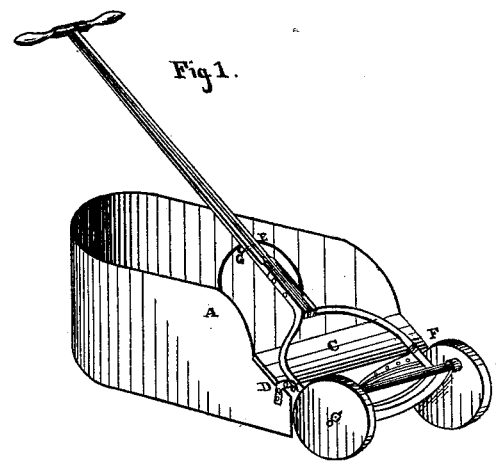
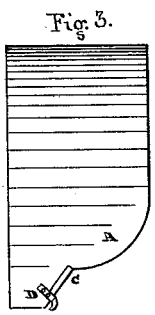
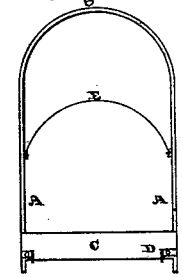
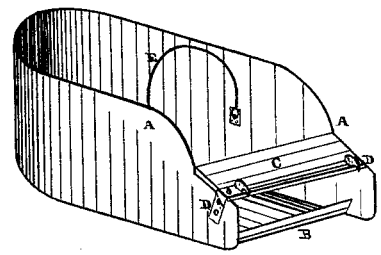
Attest
Charles West
Rynehold Opitz
Inventor
Alonzo H. Wood

UNITED STATES PATENT OFFICE.

ALONZO H. WOOD, OF TOLEDO, OHIO.

IMPROVEMENT IN LAWN-MOWER ATTACHMENTS.

Specification forming part of Letters Patent No. 190,994, dated May 22, 1877; application filed February 7, 1877.

*To all whom it may concern:*

Be it known that I, ALONZO H. WOOD, of Toledo, in the county of Lucas and State of Ohio, have invented a new and useful Improvement in a Lawn-Mower Attachment, which improvement is fully set forth in the following specification and accompanying drawings, in which—

Figure 1 is a perspective view of a lawn-mower with my improvement attached. Fig. 2 is a detached perspective view of the attachment. Fig. 3 is a side elevation, and Fig. 4 a front view of the same.

Similar letters of reference occurring on the several figures indicate like parts.

The object of my invention is to furnish a receptacle for catching grass as it is cut by a lawn-mover; and it consists in the general arrangement of parts and details of construction, all as will be hereinafter more fully described, and pointed out in the claim.

In the drawings, A A represent the sides of an open box, the front end being entirely removed. The bottom is cut back, as shown, and on its edge is placed the bulk-head B. The ends of the side-boards are cut to an angle, as shown, and connected by the dash-board C, placed at the same angle. On each end of the dash-board is placed a hook, D D, which, with the bail E, serve to fasten the attachment to a lawn-mower. On each of the arms of the handle to the lawn-mower, Fig. 1, is placed a saddle with set screw F F, which can be fastened at any desired point. Beneath the handle is placed the hook G.

To adjust the attachment to the lawn-mower place the attachment beneath the handle of the machine, catch the hooks D D over the set-screws F F, which are adjusted so that the dash-board C barely touches the revolving knife, draw the bail E over the hook G, and the attachment will be firmly fastened to the mower.

It will be seen that, as the grass is cut and thrown to the rear, it readily falls into the box, and that part of the grass which has an upward tendency, or is inclined to follow the motion of the knife, is stopped by the dash-board C. The bulk-head B prevents the grass from crowding onto the roller or knife of the machine.

I am aware that different constructions of boxes for attachment to lawn-mowers have been heretofore used, but none of which anticipate the construction as herein described and shown.

What I claim as new and useful is—

As an improved article of manufacture, a receptacle for cut grass, consisting of the sides A, bail E, bulk-head B, and dash-board C, provided with hooks D D, the several parts being constructed, arranged, and adapted for use in connection with a lawn-mower, substantially as specified.

ALONZO H. WOOD.

Witnesses:
 RYNEHOLD OPITZ,
 CHARLES WEST.